(12) United States Patent
David et al.

(10) Patent No.: US 9,180,497 B2
(45) Date of Patent: Nov. 10, 2015

(54) TOOL FOR CLEANING AND/OR DRYING A CAVITY

(75) Inventors: Hermann-Josef David, Monschau (DE); Egon Käske, Aachen (DE)

(73) Assignee: Duerr Ecoclean GmbH, Filderstadt (DE)

( * ) Notice: Subject to any disclaimer, the term of this patent is extended or adjusted under 35 U.S.C. 154(b) by 625 days.

(21) Appl. No.: 13/580,044

(22) PCT Filed: Feb. 28, 2011

(86) PCT No.: PCT/EP2011/052937
§ 371 (c)(1),
(2), (4) Date: Aug. 20, 2012

(87) PCT Pub. No.: WO2011/107435
PCT Pub. Date: Sep. 9, 2011

(65) Prior Publication Data
US 2012/0312329 A1    Dec. 13, 2012

(30) Foreign Application Priority Data
Mar. 5, 2010  (DE) .......................... 10 2010 002 633

(51) Int. Cl.
  *B08B 9/00*   (2006.01)
  *B08B 5/02*   (2006.01)
  *A21C 7/00*   (2006.01)
  *B08B 9/032*  (2006.01)

(52) U.S. Cl.
  CPC . *B08B 5/02* (2013.01); *A21C 7/005* (2013.01); *B08B 9/00* (2013.01); *B08B 9/032* (2013.01)

(58) Field of Classification Search
None
See application file for complete search history.

(56) References Cited

FOREIGN PATENT DOCUMENTS

| CA | 2 555 889 A1 | 2/2008 |
|----|---|---|
| DE | 198 27 173 A1 | 12/1999 |
| DE | 103 18 238 A1 | 11/2004 |
| DE | 10 2005 019 285 B3 | 6/2006 |
| DE | 10 2006 012 291 A1 | 10/2006 |
| DE | 103 18 238 B4 | 2/2007 |

OTHER PUBLICATIONS

International Search Report dated Jun. 16, 2011 of international application PCT/EP 2011/052937 on which this application is based.
English translation of the International Preliminary Report on Patentability of the international searching authority dated Sep. 25, 2012 in international patent application PCT/EP2011/052937 on which the claim of priority is based.

*Primary Examiner* — Eric Golightly
(74) *Attorney, Agent, or Firm* — Walter Ottesen P.A.

(57) ABSTRACT

The invention relates to a tool for cleaning and/or drying a cavity in a workpiece, such as a hole, in particular a threaded bore. The workpiece has a workpiece adapter. The workpiece adapter includes a workpiece contact surface and has a connector for feeding cleaning medium and/or drying medium. There is an opening in the connection adapter for discharging cleaning medium and/or drying medium containing dirt particles. A nozzle having a nozzle chamber is formed in the workpiece adapter. The connector opens into the nozzle chamber such that a cyclonic flow of the fed cleaning medium and/or drying medium can form in the nozzle and exits the nozzle. The cyclonic flow transports dirt particles from the cavity in the workpiece to the opening for discharging dirt particles and cleaning medium and/or drying medium.

9 Claims, 3 Drawing Sheets

TOOL FOR CLEANING AND/OR DRYING A CAVITY

CROSS REFERENCE TO RELATED APPLICATIONS

This application is the national stage application of international patent application PCT/EP 2011/052937, filed Feb. 28, 2011, designating the United States and claiming priority from German application 10 2010 002 633.6, filed Mar. 5, 2010, and the entire content of both applications is incorporated herein by reference.

FIELD OF THE INVENTION

The invention relates to a tool for cleaning and/or drying a cavity accessible through an opening, for instance a recess in a workpiece, for example, a bore, in particular a threaded bore, comprising a workpiece adapter which has a workpiece contact surface and a connection for the supply of cleaning medium and/or drying medium and which has an opening for the discharge of dirt particles and cleaning medium and/or drying medium containing liquid or vapor particles. The invention also relates to a cleaning and/or drying apparatus comprising such a tool. In addition, the invention relates to a process for cleaning and/or drying recesses, in particular bores and threaded bores, in workpieces.

BACKGROUND OF THE INVENTION

A tool and a process of the type mentioned in the introduction are known from DE 103 18 238 B4. The document describes a tool for cleaning the inner surfaces of threaded bores in a workpiece which has a lance-shaped blowing insert. This blowing insert can be inserted into a threaded bore. A supply channel for cleaning medium is formed in the blowing insert. The supply channel has an opening slot which extends in the longitudinal direction over the blowing insert. The opening slot serves for directly applying a flow of cleaning medium tangentially to the wall of a threaded bore. Dirt particles can thereby be removed from the thread turns in the threaded bore. In order to achieve a satisfactory cleaning action with this cleaning tool, it is necessary to adapt the length of the blowing insert to the depth of a threaded bore to be cleaned. The cleaning tool therefore has a technically complex design. A rotatory movement of the cleaning tool is additionally required for the defined cleaning of portions of a threaded bore which lie far away from the opening slot in a workpiece.

For machining workpieces, for instance engine components, for example, cylinder heads, cooling lubricants are used and chips are formed. As a result, workpieces are contaminated. These contaminants can cause disruptions in subsequent installation processes and impair the technical functionality of systems which are produced from corresponding workpieces. Instances of contamination with cooling lubricants and chips in cylinder head bores and injection nozzles can cause irreparable damage to the engine in the case of internal combustion engines.

SUMMARY OF THE INVENTION

It is an object of the invention to provide a tool having an improved cleaning and/or drying action for recesses in a workpiece, and also to specify an improved process for cleaning and/or drying workpiece recesses which is suitable, in particular, for removing cooling lubricants and chips from bores, in particular from blind bores and from threaded bores, and for cleaning and/or drying cylindrical cavities which are open on one side.

This object is achieved by a tool of the type mentioned in the introduction, in which a nozzle with a nozzle chamber is formed in the workpiece adapter, into which nozzle chamber the connection for the supply of cleaning and/or drying medium opens in such a manner that a cyclonic flow of cleaning and/or drying medium supplied into the nozzle can form in the nozzle, the cyclonic flow transporting dirt particles from the recess in the workpiece to the opening for the discharge of dirt particles and cleaning medium and/or drying medium containing liquid droplets or vapor in the workpiece adapter.

One concept of the invention is that the wall of a recess in a workpiece can be cleaned and/or dried with a high degree of efficiency by applying a cyclonic flow thereto, like the wall of a hydrocyclone which is used for the centrifugal separation of liquid mixtures. In addition, one concept of the invention is to use the so-called secondary cyclonic flow, which is in the form of the inner, usually upwardly directed vortex in a hydrocyclone, for transporting away dirt particles or liquid droplets out of a recess in a workpiece.

The tool can be operated with fluids as the cleaning medium, in particular with air, gas or water. A high cleaning action can be achieved by operating the cleaning tool with cleaning medium which is mixed with granules or ice crystals. The tool can also be used for drying cavities. To this end, hot air is economically used as the drying medium in the tool.

In a preferred configuration of the invention, the nozzle chamber extends with a tapering cross-sectional geometry toward the workpiece contact surface. A particularly good cleaning action and/or drying action is achieved in that the nozzle chamber has an annular gap opening in a portion on the workpiece side. In particular, it is advantageous if an outflow channel is formed in the nozzle chamber, with which outflow channel dirt particles and cleaning medium can be transported to the opening in the tool adapter. In this case, it is practical if the outflow channel has an axis which is aligned with the nozzle axis. Since the outflow channel has a displaceable inlet opening for dirt particles, the removal of dirt particles from the recess in the workpiece can be optimized. It is advantageous in particular if the inlet opening of the outflow channel for dirt particles, liquid particles or liquid vapor can be moved into the recess in the workpiece. In an advantageous configuration of the invention, the workpiece contact surface is formed with a sealing portion, which preferably comprises a seal, for example, an O-ring, and with which the recess in the workpiece can be encompassed.

The tool according to the invention is suitable for use in an apparatus for cleaning and/or drying, which comprises a device for the supply of cleaning and/or drying medium, which provides pressurized cleaning and/or drying medium through a fluid channel for the tool. In this case, it is possible to simultaneously clean and/or dry a plurality of workpieces having recesses or a plurality of recesses on a workpiece in that the apparatus for cleaning and/or drying comprises a multiplicity of corresponding tools. In particular, it is practical to provide a single-axis or else multiple-axis manipulator, in particular a handling robot, for the apparatus for receiving workpieces having recesses which are to be cleaned or dried, by means of which manipulator a received workpiece can be placed onto the workpiece contact surface of a tool.

The invention also consists in cleaning a recess in a workpiece, for example, a bore, in particular a threaded bore or else a cylindrical cavity, for instance the interior of a tube with a termination, by guiding cleaning medium and/or drying medium into the recess in the workpiece with a primary cyclonic flow. A liquid fluid or else a gaseous fluid can be used here as the cleaning medium. In particular, it is possible in this case to transport away particles out of the recess by means of a secondary cyclonic flow which forms in the recess. Hot air, for example, is suitable for drying a recess in a workpiece. A particularly good cleaning effect can be achieved if the primary cyclonic flow is generated by way of a nozzle formed in a workpiece adapter which lies against the workpiece. Here, it is practical if the workpiece adapter encompasses the recess in the workpiece with a sealing action by way of a sealing portion formed in a workpiece contact surface. With this cleaning process, in particular bores or threaded bores can be cleaned with the outlet opening of the nozzle being adapted to the bore diameter of the bores or threaded bores by means of which outlet opening the primary cyclonic flow is generated. In addition, bore holes in walls, in concrete or rock can also be cleaned using a tool according to the invention. Air or water is particularly suitable as the cleaning medium for this purpose. Since, here, the cleaning medium which is mixed with dirt particles, for instance air and concrete dust, and which flows through the opening for the discharge of dirt particles and cleaning medium in the workpiece is guided through a filter system or is collected by way of a filter bag, it is possible to avoid contamination of the environment with, in particular, dust-like dirt particles.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
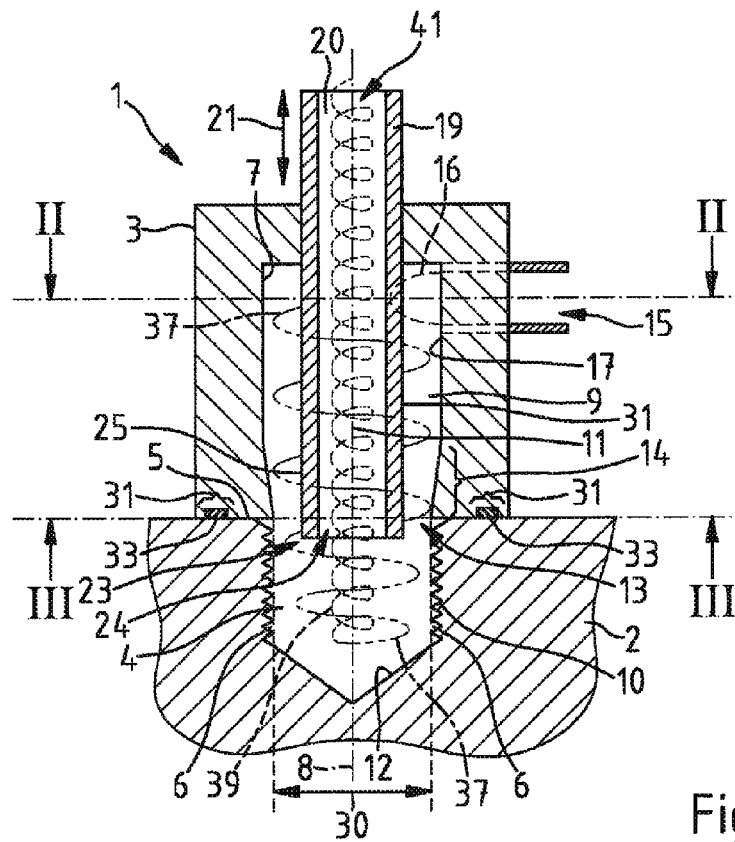
FIG. 1 shows a section of a tool for cleaning and/or drying with a workpiece.

FIG. 1 shows a tool 1 for cleaning and/or drying on a workpiece 2. The tool 1 comprises a workpiece adapter 3. The workpiece adapter 3 has a workpiece contact surface 5 and comprises a nozzle 7 with a nozzle chamber 9. The nozzle chamber 9 extends along an axis 11 in a manner rotationally symmetrical to an opening 13 in the workpiece contact surface 5. In a portion 14 which faces toward the workpiece contact surface 5, the nozzle chamber 9 is conically tapered, that is, the diameter of the cross section of the nozzle chamber 9 decreases toward the workpiece contact surface 5.

Figure 2:
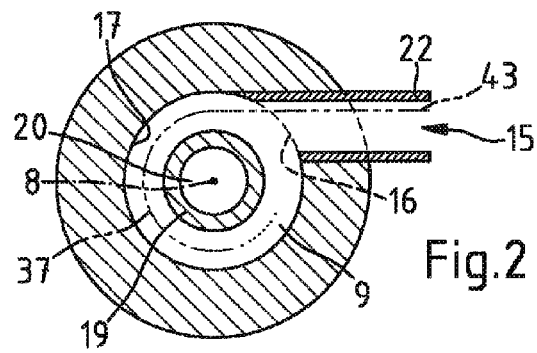
FIG. 2 shows a section of the tool for cleaning and/or drying in the plane II-II from FIG. 1.

The tool 1 has a connection 15 for a cleaning or drying medium. FIG. 2 shows a section of the tool for cleaning in the plane II-II of FIG. 1. The connection 15 is guided through the housing of the nozzle chamber offset laterally in relation to the axis 11 of the nozzle chamber 9. The connection 15 opens by way of an opening 16 in the side wall 17 in the nozzle chamber 9. In this case, the wall portion 22 of the connection 15 merges tangentially into the wall 17 of the nozzle chamber. This has the effect that the fluid flow 43 at the connection 15 in the nozzle chamber is forced to circulate, such that the desired primary cyclonic flow 37 is formed in the nozzle chamber 9. Pressurized cleaning or drying medium can flow through the connection 15 into the nozzle chamber 9. An outflow tube 19 projects into the nozzle chamber 9. The outflow tube 19 forms an outflow channel 20 for cleaning medium which is mixed with dirt particles 6, or for drying medium which is mixed with liquid and/or vapor particles.

Figure 3:
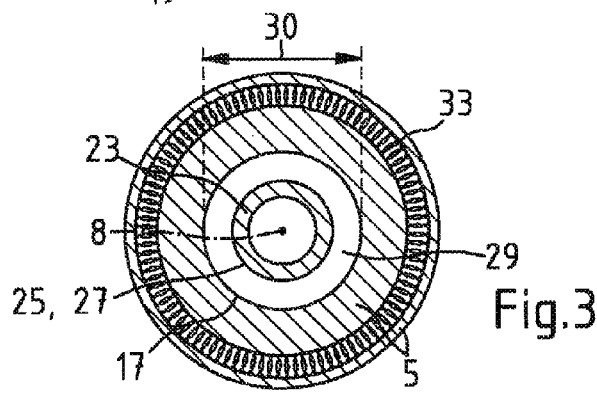
FIG. 3 shows a plan view of the tool for cleaning and/or drying in the plane from FIG. 1.

FIG. 3 shows a plan view of the workpiece contact surface 5 of the workpiece adapter 3. The end portion 23 is provided with an opening 24, through which cleaning fluid, which is mixed with dirt particles or corresponding drying medium, can flow into the outflow tube 19. The wall (25, 27) of the outflow tube 19, which lies in the region of the workpiece contact surface 5, delimits an annular gap 29 with the wall 17 of the nozzle chamber 9 on the workpiece contact surface 5.

An outer diameter of the outflow tube 19, which is three times greater than the width of the annular gap 29, is practical. Tests have shown that a very good cleaning action or drying medium can be achieved with the tool 1 when the length of the nozzle chamber 9 is approximately 8 times the diameter with which the connection 15 for cleaning medium opens into the nozzle chamber 9.

The outflow tube 19 is arranged so as to be adjustable in the nozzle chamber 9 according to the double-headed arrow 21. The outflow tube 19 has an end portion 23 on the workpiece side. By moving the outflow tube 19 according to the double-headed arrow 21, the positioning of the opening 24 thereof can be initiated. The opening 24 can be positioned within the nozzle chamber 9. However, it is also practical for the outflow tube 19 to be set in such a way that the opening 24 is located in the plane of the workpiece contact surface. It is also advantageous that it is possible to set the outflow tube 19 in a position in which the opening 24 is arranged within a recess 4 in the workpiece 2.

A particularly good cleaning or drying action can be achieved with the tool 1 particularly in the case of workpiece bores with a diameter 30 which corresponds to the diameter of the opening 13 in the nozzle chamber 9 in the workpiece contact surface 5.

The recess 4 in the workpiece 2 has a threaded bore 4. Dirt particles 6 are present in the threaded bore 4. The threaded bore 4 is a blind hole having a tapering geometry at the bottom region 12. In order to clean the threaded bore 4 of the dirt particles 6, the workpiece 2 with the threaded bore 4 is placed onto the workpiece contact surface 5 of the workpiece adapter 3 in such a way that the axis 8 of the threaded bore 4 is aligned with the axis 11 of the nozzle chamber 9 in the tool 1. In order to make it possible for the workpiece contact surface 5 to bear sealingly against the workpiece 2, the tool contact surface 5 has a sealing portion 31 with a seal in the form of an O-ring 33.

For cleaning the threaded bore 4, pressurized cleaning medium 35 for the connection 15 on the tool 1 flows laterally into the nozzle chamber 9. In the process, a primary cyclonic flow 37, by way of which the cleaning medium passes into the threaded bore 4 of the workpiece 2, forms in the nozzle chamber 9.

In the threaded bore 4, the primary cyclonic flow 37 entrains the dirt particles which are trapped in thread paths 10. On account of the conically tapering geometry in the portion 14 of the nozzle chamber 9, cleaning medium is displaced in the direction of the axis 11 of the nozzle chamber 9. This leads to a build-up in the threaded bore 4. As a result, a secondary cyclonic flow 39, which transports dirt particles from the threaded bore 4 toward the tool 1, is formed in the borehole 12. This secondary cyclonic flow 39 is accepted by the outflow channel 20 of the outflow tube 19. It passes via the outlet opening 41 in the outflow tube 19, together with the dirt particles 6, to the outside.

Figure 4:
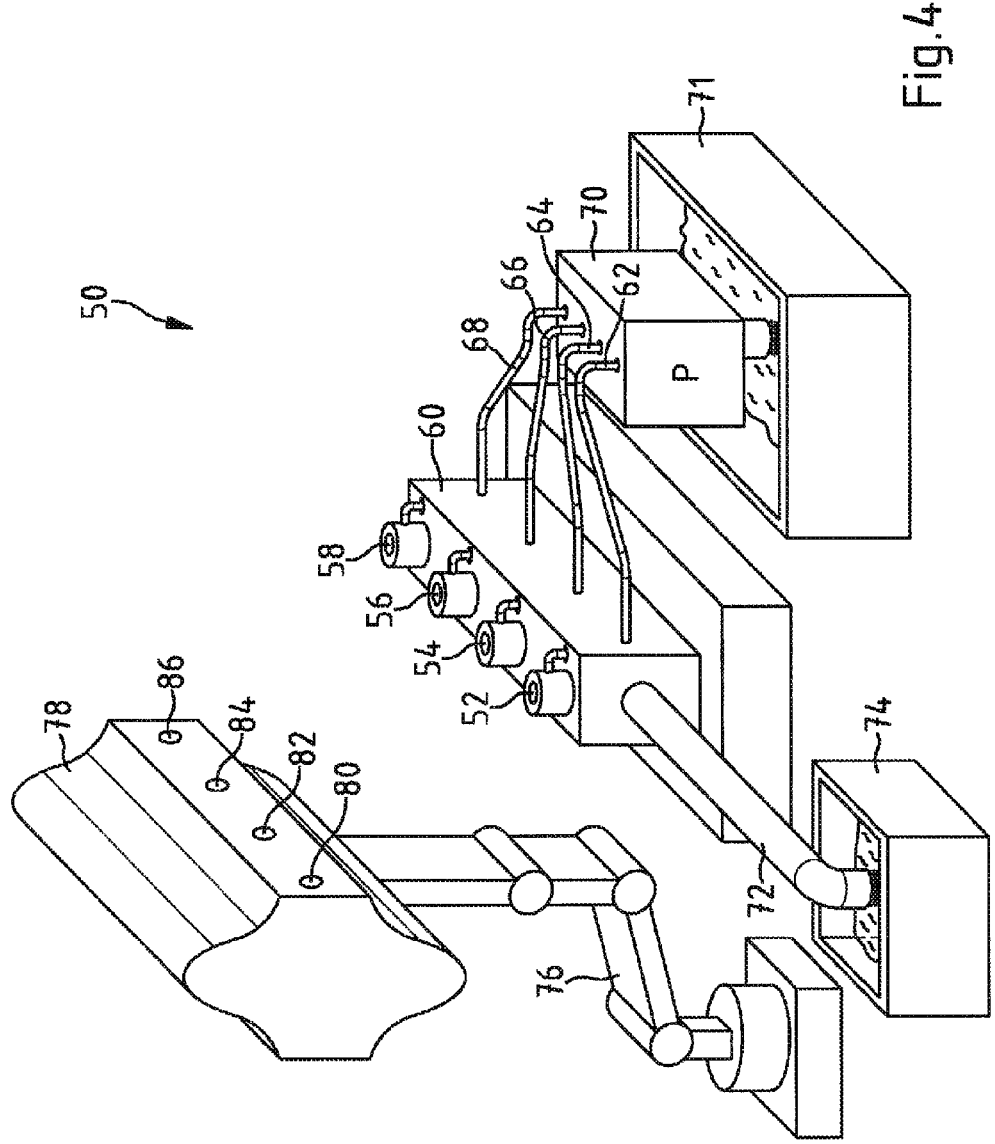
FIG. 4 shows a cleaning apparatus comprising a plurality of tools for cleaning and a manipulating robot; and, FIG. 5 shows a section of a tool for cleaning and drying tubular bodies with a termination.

FIG. 4 shows a cleaning apparatus 50 comprising a plurality of cleaning tools (52, 54, 56, 58). Each cleaning tool (52, 54, 56, 58) has a structure which corresponds to that of the tool 1 in FIGS. 1 and 2. The cleaning tools (52, 54, 56, 58) are accommodated on a cleaning block 60. On the cleaning block 60, the cleaning tools (52, 54, 56, 58) are supplied with cleaning medium via pressure connections (62, 64, 66, 68). This cleaning medium is conveyed from a fluid tank 71 via a pump block 70. The cleaning block 60 is provided with an outflow channel 72 for carrying away cleaning medium mixed with dirt particles to a collection tank 74. As an alternative to this, the cleaning medium mixed with dirt particles can also be guided to a processing system for cleaning medium, for example.

The cleaning apparatus 50 comprises a handling robot 76, with which a workpiece in the form of an engine block 78 can be arranged on the cleaning tools (52, 54, 56, 58) in a pinpoint manner, in order to clean dirt particles from threaded bores (80, 82, 84, 86) in the engine block 78.

As an alternative to this, it is also possible to provide a single-jointed or multi-jointed manipulator for the cleaning tools (52, 54, 56, 58), with which manipulator the cleaning tools can be moved toward a corresponding workpiece.

Figure 5:
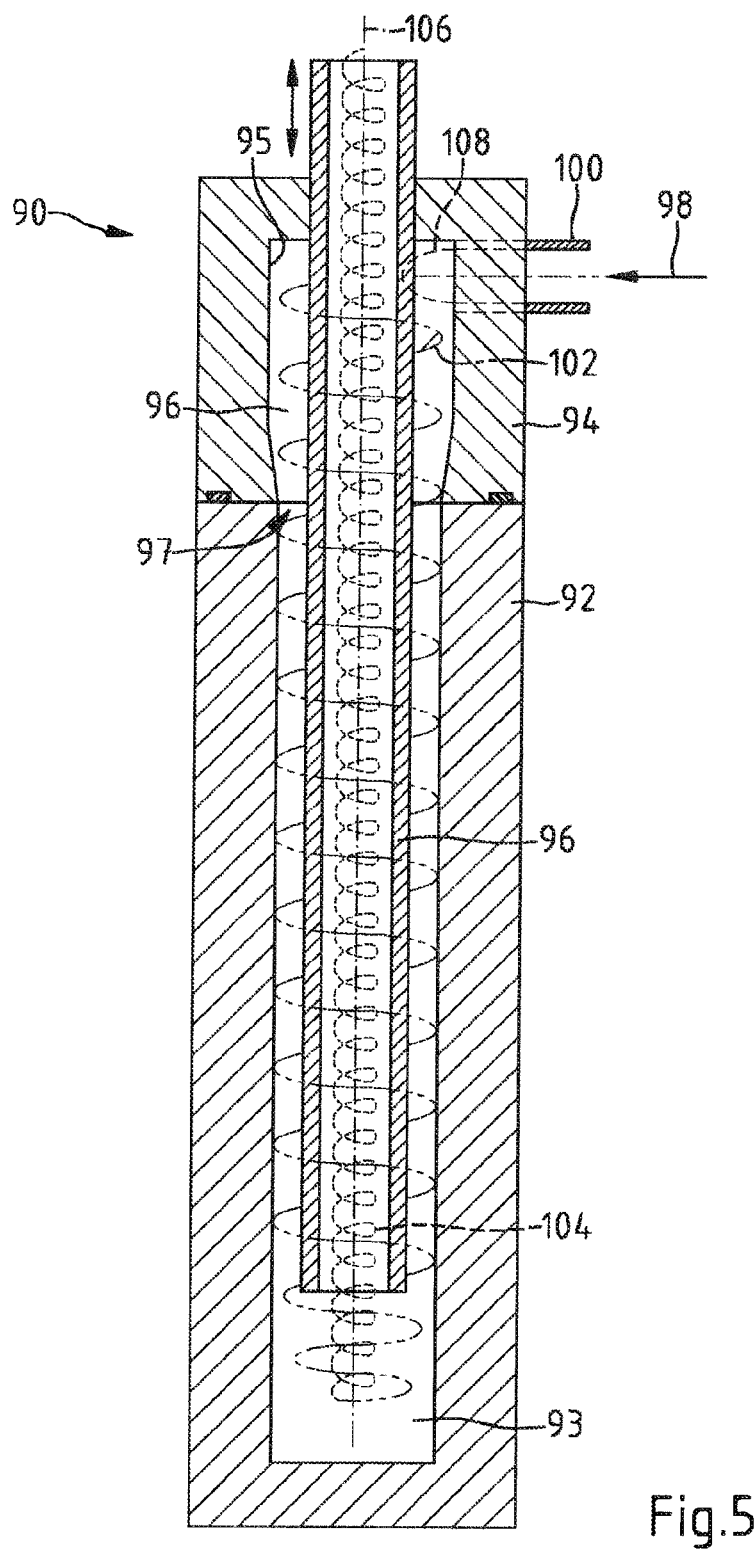

The tool 90 in FIG. 5 is designed for cleaning and drying a tubular body 92 which has a cylindrical hollow volume 93 by means of hot air. To this end, the tool 90 has a workpiece adapter 94 having a nozzle chamber 96. The through-opening 97 in the nozzle chamber 96 has a diameter which corresponds to the inner diameter of the tubular body 92. The tool 90 has an outflow tube 96, which serves as a discharge for hot air mixed with dirt particles and liquid particles. The outflow tube 96 is adapted to the length of the tubular body 92. By injecting pressurized hot air 98 through the connection 100 of the tool 90 via the opening 108 in the nozzle chamber 96, which, like the opening 16 in the nozzle chamber 9 of the tool 1 shown in FIG. 1, is offset laterally in relation to the axis 106 of the nozzle chamber 96, a primary cyclonic flow 102 forms in the nozzle chamber 96 and in the tubular body 92. The cyclonic flow entrains dirt particles and liquid droplets on the inner wall of the tubular body 92. A secondary cyclonic flow 104 is formed in the region of the lower termination of the tubular body 92. This cyclonic flow 104 is collected by way of the outflow tube 96, and thus passes to the outside.

To summarize, the following preferred features are noted: a tool 1 for cleaning and/or drying a recess 4 in a workpiece, for example, a bore, in particular a threaded bore, has a workpiece adapter 3. This workpiece adapter has a workpiece contact surface 5 and has a connection 15 for the supply of cleaning and/or drying medium. There is an opening 41 in the workpiece adapter 3 for the discharge of cleaning and/or drying medium mixed with dirt particles. A nozzle 7 with a nozzle chamber 9 is formed in the workpiece adapter 3. The connection 15 for the supply of cleaning and/or drying medium opens into the nozzle chamber 9 in such a manner that a cyclonic flow 37 of cleaning and/or drying medium can form in the nozzle 7, the cyclonic flow exiting the nozzle 7. The cyclonic flow 37 transports dirt particles 6 from the recess 4 in the workpiece 2 to the opening 41 for the discharge of dirt particles 6 in the workpiece adapter 3.

The invention claimed is:

1. A worktool for cleaning and/or drying a recess in a workpiece wherein dirt particles and/or vapor particles can accumulate, the worktool comprising:
    an adaptor having a workpiece contact surface for contacting said workpiece when cleaning and/or drying said recess thereof;
    said adaptor including a housing and a nozzle having a nozzle chamber formed in said housing;
    said housing having a side wall delimiting said nozzle chamber and said nozzle defining an axis;
    a connection for passing a medium for cleaning and/or drying said recess into said nozzle chamber;
    said connection being guided through said side wall with an offset with respect to said axis so as to open in a wall section of said side wall passing tangentially into said side wall of said nozzle chamber;
    said adapter having an opening through which said medium with said dirt particles and/or said vapor particles exit therefrom after said medium has passed into and from said recess;
    an outflow channel arranged in said nozzle chamber for transporting said medium with said dirt particles and/or said vapor particles to said opening; and,
    said outflow channel defining an axis in alignment with said axis of said nozzle.

2. The worktool of claim 1, wherein said nozzle chamber extends toward said workpiece contact surface with a tapering cross-sectional geometry.

3. The worktool of claim 1, wherein said nozzle chamber has an annular-shaped gap formed in a section thereof facing toward said workpiece.

4. The worktool of claim 1, wherein said outflow channel has a displaceable inlet opening for receiving said medium with said dirt particles and/or said vapor particles.

5. The worktool of claim 4, wherein said inlet opening of said outflow channel is displaceable into said recess of said workpiece.

6. The worktool of claim 1, wherein said workpiece contact surface has a sealing section causing said recess in said workpiece to be effectively sealed in surrounding relationship thereto.

7. The worktool of claim 6, wherein said sealing section includes a seal.

8. The worktool of claim 1, wherein said recess in said workpiece is accessible via an opening formed therein and said medium is a cleaning liquid or drying air or hot air.

9. The worktool of claim 1, wherein said recess is a threaded bore formed in said workpiece.

\* \* \* \* \*